UNITED STATES PATENT OFFICE.

HEINRICH WACHWITZ, OF HERSBRUCK, GERMANY, ASSIGNOR OF ONE-HALF TO MORITZ DÜNKELSBÜHLER, OF NUREMBERG, BAVARIA, GERMANY.

PROCESS OF COATING METALS PREPARATORY TO BEING HEATED.

SPECIFICATION forming part of Letters Patent No. 708,788, dated September 9, 1902.

Application filed October 28, 1901. Serial No. 80,236. (Specimens.)

*To all whom it may concern:*

Be it known that I, HEINRICH WACHWITZ, director of the German Wachwitz Metal Company, Limited, a subject of the King of Bavaria, and a resident of Hersbruck, near Nuremberg, Bavaria, Germany, have invented certain new and useful Improvements in Processes for Coating Metals Preparatory to Being Heated; and I do hereby declare the following to be a full, clear, and exact description of the invention, such as will enable others skilled to make and use the same.

It is common knowledge that metals cannot be welded together unless they are heated and also that base metals will oxidize more or less when heated, such oxidation preventing close metallic union or effective welding.

The object of the present invention is to prevent oxidation by a simpler, more secure, and cheaper method. For this purpose the surfaces of the base metals intended to be plated or welded are rubbed with metallic aluminium before heating. This causes particles of aluminium to adhere to the surface of the base metals and to coat the same with a thin layer of aluminium, which excludes the air and prevents the oxidation of the surfaces so treated when being heated. Aluminium itself has the property of neither oxidizing nor of changing its color when exposed to heat.

In practice the surface of the metal to be welded is thoroughly rubbed with the metallic aluminium, thereby covering the same with a thin coating of aluminium. Thus it will be observed that the outer surface of the aluminium only is exposed to the direct action of the heat when the metal to be welded is subjected to the necessary welding heat. The lower face of the aluminium being in contact with the metal practically acts as a protection therefor. In other words, the aluminium fills the pores of the metal, thus preventing the oxidation, or, more commonly speaking, the gathering of scale upon the base metal.

The aforesaid rubbing of the surfaces of the base metals can be done with either aluminium wire or sheeting or solid bodies and either by hand or by suitable mechanical means.

Having now described my invention, what I claim is—

The process of welding metals, which consists in rubbing the surface of the metals with metallic aluminium, so as to cause a thin coating of the same to adhere to such metals and thereby prevent their oxidation, during the subsequent heating, and then suitably heating and welding together said metals, substantially as described.

In testimony whereof I affix my signature in presence of two witnesses.

HEINRICH WACHWITZ.

Witnesses:
ALEX WIELE,
MAX SCHNEIDER.